US011578206B2

(12) United States Patent
Kim et al.

(10) Patent No.: US 11,578,206 B2
(45) Date of Patent: Feb. 14, 2023

(54) POLYAMIDE RESIN COMPOSITION AND MOLDED ARTICLE COMPRISING THE SAME

(71) Applicant: Lotte Advanced Materials Co., Ltd., Yeosu-si (KR)

(72) Inventors: Kyung Rae Kim, Uiwang-si (KR); Yeong Deuk Seo, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 177 days.

(21) Appl. No.: 16/170,190

(22) Filed: Oct. 25, 2018

(65) Prior Publication Data

US 2019/0127579 A1 May 2, 2019

(30) Foreign Application Priority Data

Oct. 30, 2017 (KR) .................. 10-2017-0142186

(51) Int. Cl.
*C08L 77/10* (2006.01)

(52) U.S. Cl.
CPC ......... *C08L 77/10* (2013.01); *C08L 2205/025* (2013.01); *C08L 2205/03* (2013.01)

(58) Field of Classification Search
CPC . C08L 77/10; C08L 2205/025; C08L 2205/03
See application file for complete search history.

(56) References Cited

U.S. PATENT DOCUMENTS

| 3,484,403 | A | * | 12/1969 | Brunson | ............. | C08L 2666/14 |
| | | | | | | 525/184 |
| 3,877,965 | A | * | 4/1975 | Broadbent | .............. | C23C 18/44 |
| | | | | | | 427/304 |
| 4,552,626 | A | | 11/1985 | Stevenson | | |
| 4,780,505 | A | * | 10/1988 | Mashita | .................. | C08L 51/06 |
| | | | | | | 525/179 |
| 5,256,719 | A | * | 10/1993 | Sham | ...................... | C08K 7/00 |
| | | | | | | 524/262 |
| 5,292,805 | A | | 3/1994 | Paschke et al. | | |
| 5,324,766 | A | | 6/1994 | Ikejiri et al. | | |
| 6,117,561 | A | * | 9/2000 | Jacquemet | ............. | C08L 23/06 |
| | | | | | | 428/475.5 |
| 6,617,381 | B1 | | 9/2003 | Kumaki et al. | | |
| 9,845,389 | B2 | | 12/2017 | Harder et al. | | |
| 9,932,444 | B2 | | 4/2018 | Washio et al. | | |
| 10,450,460 | B2 | | 10/2019 | Kim et al. | | |
| 2001/0003766 | A1 | * | 6/2001 | Nozaki | .................... | C08L 77/10 |
| | | | | | | 525/66 |
| 2006/0100334 | A1 | | 5/2006 | Ebert et al. | | |
| 2009/0127740 | A1 | * | 5/2009 | Kirchner | ............. | B29C 45/0001 |
| | | | | | | 264/272.11 |
| 2009/0142585 | A1 | | 6/2009 | Kobayashi et al. | | |
| 2009/0143520 | A1 | | 6/2009 | Elia et al. | | |
| 2010/0028602 | A1 | * | 2/2010 | Naritomi | ................. | B32B 5/147 |
| | | | | | | 428/147 |
| 2010/0160008 | A1 | | 6/2010 | Topoulos | | |
| 2010/0237293 | A1 | | 9/2010 | Kirchner | | |
| 2010/0324195 | A1 | | 12/2010 | Williamson | | |
| 2012/0027983 | A1 | | 2/2012 | Elia | | |
| 2012/0165445 | A1 | | 6/2012 | Lee et al. | | |
| 2012/0196961 | A1 | * | 8/2012 | Kobayashi | ............. | C08K 5/175 |
| | | | | | | 524/204 |
| 2012/0196973 | A1 | | 8/2012 | Doshi et al. | | |
| 2013/0165599 | A1 | | 6/2013 | Je et al. | | |
| 2013/0209784 | A1 | | 8/2013 | Nakagawa et al. | | |
| 2013/0237658 | A1 | * | 9/2013 | Eguchi | .................... | C09C 1/021 |
| | | | | | | 524/425 |
| 2014/0066561 | A1 | | 3/2014 | Pfeghar et al. | | |
| 2014/0179851 | A1 | | 6/2014 | Pfleghar et al. | | |
| 2014/0179866 | A1 | * | 6/2014 | Pfleghar | ................. | C08K 3/013 |
| | | | | | | 524/607 |
| 2015/0175804 | A1 | | 6/2015 | Aepli | | |
| 2015/0274968 | A1 | | 10/2015 | Bayer et al. | | |
| 2015/0329670 | A1 | | 11/2015 | Washio et al. | | |
| 2016/0083509 | A1 | | 3/2016 | Im et al. | | |
| 2016/0102202 | A1 | * | 4/2016 | Lamberts | ................ | C08L 77/00 |
| | | | | | | 524/413 |
| 2016/0130439 | A1 | * | 5/2016 | Koch | ..................... | C08G 69/26 |
| | | | | | | 524/538 |
| 2016/0369097 | A1 | | 12/2016 | Lee et al. | | |
| 2018/0244917 | A1 | | 8/2018 | Kim et al. | | |

(Continued)

FOREIGN PATENT DOCUMENTS

| CN | 101861358 A | 10/2010 |
| CN | 101878252 A | 11/2010 |

(Continued)

OTHER PUBLICATIONS

Bartczak—polymer blends w—calcium carbonate—Polymer—1999 (Year: 1999).*
Kim—KR 2017-0024201 A—MT—Kor#1—2017 (Year: 2017).*
Kim—KR 2017-0026833 A—MT—Kor#2—aromatic+aliphatic polyamide+chelating agent—2017 (Year: 2017).*
Nylon 6T—Polymer Properties—Semi-aromatic Polyamides (Year: 2020).*
Yamada—JP 2017-171879 A—Biblio—aromatic PA+aliphatic PA+PE wax + calcium carb 1-50 um—Sep. 28, 2017 (Year: 2017).*
Office Action in counterpart Chinese Application No. 201811247837.0 dated Nov. 17, 2020, pp. 1-8.
Xia Shengli et al., "Properties of PA66/EPDM-g-MAH/CaCO3 Composites" Department of Chemical and Biological Engineering, Nantong Vocational University, Nantong, China, vol. 45, No. 10, Oct. 2017, pp. 119-125.

(Continued)

*Primary Examiner* — John Vincent Lawler
(74) *Attorney, Agent, or Firm* — Additon, Pendleton & Witherspoon, P.A.

(57) ABSTRACT

A polyamide resin composition and a molded article including the same are disclosed. The polyamide resin composition includes: (A) an aromatic polyamide resin; (B) an aliphatic polyamide resin; (C) a modified polyolefin resin; and (D) calcium carbonate. The polyamide resin composition can have good properties in terms of heat resistance, impact resistance, plating adhesion, and the like.

10 Claims, No Drawings

(56) References Cited

U.S. PATENT DOCUMENTS

| | | | |
|---|---|---|---|
| 2018/0244919 A1* | 8/2018 | Kim | C08K 3/36 |
| 2019/0077957 A1* | 3/2019 | Yamada | C08K 3/26 |
| 2019/0202186 A1 | 5/2019 | Lee et al. | |
| 2019/0203046 A1 | 7/2019 | Lee et al. | |

FOREIGN PATENT DOCUMENTS

| | | | | |
|---|---|---|---|---|
| CN | 102264839 | A | 11/2011 | |
| CN | 102532887 | A | 7/2012 | |
| CN | 103003046 | A | 3/2013 | |
| CN | 103044905 | A | 4/2013 | |
| CN | 103339201 | A | 10/2013 | |
| CN | 103881368 | A | 6/2014 | |
| CN | 2014-173057 | A | 9/2014 | |
| CN | 104725837 | A | 6/2015 | |
| CN | 104797631 | A | 7/2015 | |
| CN | 104854192 | A | 8/2015 | |
| CN | 105504800 | A | 4/2016 | |
| CN | 106046781 | A | 10/2016 | |
| EP | 0368281 | A1 | 5/1990 | |
| EP | 0572266 | A2 | 12/1993 | |
| EP | 0690098 | A2 | 1/1996 | |
| EP | 2918624 | A1 | 9/2015 | |
| JP | 2003-112920 | A | 4/2003 | |
| JP | 2013-203851 | A | 10/2013 | |
| JP | 2017171879 | | * 9/2017 | C08K 3/24 |
| KR | 10-2010-0123178 | A | 11/2010 | |
| KR | 10-2013-0072513 | A | 11/2010 | |
| KR | 10-2013-0132437 | A | 7/2013 | |
| KR | 10-2014-0108517 | A | 9/2014 | |
| KR | 10-2016-0035954 | A | 4/2016 | |
| KR | 10-2017-0024201 | A | 3/2017 | |
| KR | 10-2017-0026833 | A | 3/2017 | |
| KR | 2017/0024201 | | * 3/2017 | C08J 5/00 |
| KR | 2017/0026833 | | * 3/2017 | C08J 5/00 |
| KR | 2017-099297 | A | 8/2017 | |
| WO | 2014/073219 | A1 | 5/2014 | |
| WO | 2017/034295 | A1 | 3/2017 | |
| WO | 2019/231160 | A1 | 12/2019 | |

OTHER PUBLICATIONS

International Search Report in commonly owned International Application No. PCT/KR2016/009307, dated Nov. 16, 2016, pp. 1-6.
Non-Final Office Action in commonly owned U.S. Appl. No. 15/754,328 dated May 8, 2019, pp. 1-18.
Office Action in commonly owned Chinese Application No. 201811635926.2 dated Jan. 28, 2021, pp. 1-10.
Office Action in commonly owned Chinese Application No. 201811617729.8 dated Dec. 21, 2020, pp. 1-6.
Office Action in commonly owned Korean Application No. 10-2018-0139660 dated Sep. 7, 2020, pp. 1-5.
Office Action in commonly owned Korean Application No. 10-2017-0185031 dated Dec. 5, 2019, pp. 1-5.
Office Action in commonly owned U.S. Appl. No. 15/754,328 dated Sep. 5, 2019, pp. 1-18.
Office Action in commonly owned Chinese Application No. 201680048870.3 dated Aug. 16, 2019, pp. 1-6.
Supplementary Search Report in commonly owned European Application No. 16839584.6 dated Apr. 16, 2019, pp. 1-7.
Final Office Action in commonly owned U.S. Appl. No. 16/233,156 dated Nov. 17, 2021, pp. 1-9.
International Search Report in commonly owned International Application No. PCT/KR2019/006091 dated Aug. 22, 2019, pp. 1-6.
Office Action in commonly owned U.S. Appl. No. 16/233,156 dated Oct. 29, 2020, pp. 1-10.
Office Action in commonly owned U.S. Appl. No. 16/233,156 dated May 19, 2021, pp. 1-6.
Advisory Action in commonly owned U.S. Appl. No. 16/233,156 dated Feb. 7, 2022, pp. 1-4.
Office Action in commonly owned U.S. Appl. No. 16/234,894 dated Nov. 4, 2020, pp. 1-9.
Office Action in commonly owned U.S. Appl. No. 16/234,894 dated Feb. 17, 2022, pp. 1-15.
Final Office Action in commonly owned U.S. Appl. No. 16/234,894 dated May 19, 2021, pp. 1-8.
Advisory Action in commonly owned U.S. Appl. No. 16/234,894 dated Sep. 8, 2021, pp. 1-3.

* cited by examiner

POLYAMIDE RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application 10-2017-0142186, filed on Oct. 30, 2017, the entire disclosure of which is incorporated herein by reference.

FIELD

The present invention relates to a polyamide resin composition and a molded article comprising the same.

BACKGROUND

Aliphatic polyamide resins, such as polyamide (PA) 66, PA6 and the like, are polyamide resins (nylon) well-known in the art. These aliphatic polyamide resins are widely used for automotive components, electric/electronic products, mechanical components, and the like.

With this trend, a method of plating a surface of a resin molded article is used to realize a metal-like appearance while substituting a metallic material with a polyamide resin material. Although an inorganic material is typically added to improve plateability of a polyamide resin material, application of the polyamide resin material can be limited due to deterioration in impact resistance thereof.

An aromatic polyamide resin is one of highly heat resistant polyamide resins, may have a semi-aromatic structure and a semi-crystalline structure, and may be generally obtained through condensation polymerization of an aromatic dicarboxylic acid with an aliphatic diamine and/or an alicyclic diamine. Highly heat resistant polyamide resins have considerably higher heat resistant temperatures than general aliphatic polyamide resins and thus can be used for various applications requiring high heat resistance.

SUMMARY OF THE INVENTION

Embodiments include a polyamide resin composition that can have good properties in terms of heat resistance, impact resistance, plating adhesion and the like.

Other embodiments include a molded article formed of the polyamide resin composition.

The polyamide resin composition can include: (A) an aromatic polyamide resin; (B) an aliphatic polyamide resin; (C) a modified polyolefin resin; and (D) calcium carbonate.

The polyamide resin composition may include: about 30% by weight (wt %) to about 50 wt % of the (A) aromatic polyamide resin; about 10 wt % to about 30 wt % of the (B) aliphatic polyamide resin; about 5 wt % to about 15 wt % of the (C) modified polyolefin resin; and about 5 wt % to about 50 wt % of the (D) calcium carbonate.

The aromatic polyamide resin may include at least one of polyamide (PA) 6T, polyamide 6T/66, polyamide 6T/DT, polyamide 6T/6I, polyamide 6I, polyamide 9T, polyamide 10T, and/or a combination thereof.

The aliphatic polyamide resin may include at least one of polyamide (PA) 6, polyamide 66, polyamide 46, polyamide 610, polyamide 611, polyamide 612, polyamide 1010, polyamide 1011, polyamide 1111, polyamide 1212, and/or a combination thereof.

A weight ratio of the aromatic polyamide resin to the aliphatic polyamide resin may range from about 1:0.2 to about 1:1.

The modified polyolefin resin may include a polyolefin resin grafted with at least one reactive group of a maleic anhydride group and/or an epoxy group.

The calcium carbonate may have an average particle diameter (D50) of about 10 μm to about 200 μm.

The polyamide resin composition may have a notched Izod impact strength of about 6 kgf·cm/cm to about 20 kgf·cm/cm, as measured on a ⅛" thick specimen in accordance with ASTM D256.

The polyamide resin composition may have a copper layer exhibiting peel strength of about 10 N/cm to about 25 N/cm, as measured on an injection-molded specimen plated with a 35 μm thick stripe-shaped copper layer and having a size of 100 mm×100 mm×3.2 mm at a peeling rate of 50 mm/min using a tensile tester.

The polyamide resin composition may have a heat deflection temperature (HDT) of about 100° C. to about 200° C., as measured on a ¼" thick specimen under a load of 1.82 MPa in accordance with ASTM D648.

Other embodiments include a molded article formed of the polyamide resin composition set forth above.

Other embodiments include a composite including: a resin layer formed of the polyamide resin composition set forth above; and a plating layer formed on at least one surface of the resin layer.

The polyamide resin composition and a molded article formed thereof can have good properties in terms of heat resistance, impact resistance, plating adhesion and the like.

DETAILED DESCRIPTION

The above and other aspects, features, and advantages of the present invention will become apparent from the detailed description of the following embodiments in conjunction. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

One embodiment of the present invention relates to a polyamide resin composition including: (A) an aromatic polyamide resin; (B) an aliphatic polyamide resin; (C) a modified polyolefin resin; and (D) calcium carbonate. The present invention provides a polyamide resin composition that can have good properties in terms of heat resistance, impact resistance, plating adhesion and the like, and a molded article formed thereof.

(A) Aromatic Polyamide Resin

According to embodiments of the present invention, the (A) aromatic polyamide resin may be a homopolymer, copolymer, ter- and/or higher-polymer formed of a monomer including an aromatic group. Herein, the term "copolymer" refers to polyamide having two or more amide and/or diamide molecular repeat units.

The aromatic polyamide resin has a structure in which a main chain includes an aromatic compound, and may be prepared through condensation polymerization of a dicarboxylic acid monomer including about 10 mol % to about 100 mol % of an aromatic dicarboxylic acid with 100 mol % of a diamine monomer including an aliphatic diamine and/or an alicyclic diamine. For example, the aliphatic and/or alicyclic diamines may be $C_4$ to $C_{20}$ aliphatic and/or alicyclic diamines, and the aromatic dicarboxylic acid may include one or more of terephthalic acid, isophthalic acid, and combinations thereof, in which an aromatic benzene ring is contained.

In other words, the aromatic polyamide resin may include, as a repeat unit, a dicarboxylic acid unit including an aromatic dicarboxylic acid unit; and a diamine unit including at least one of an aliphatic diamine unit and/or an alicyclic diamine unit.

In exemplary embodiments, the aromatic dicarboxylic acid unit may be derived from one or more aromatic dicarboxylic acids such as but not limited to terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like, and/or combinations thereof.

In exemplary embodiments, the dicarboxylic acid unit may include the aromatic dicarboxylic acid unit in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %, based on the total mol % (100 mol %) of the dicarboxylic acid unit. Further, according to some embodiments, the aromatic dicarboxylic acid unit may be present in an amount of from about any of the foregoing amounts to about any other of the foregoing amounts.

In exemplary embodiments, the dicarboxylic acid unit may further include a unit derived from a nonaromatic dicarboxylic acid in addition to the aromatic dicarboxylic acid unit. The nonaromatic dicarboxylic acid may be an aromatic and/or alicyclic dicarboxylic acid. For example, the nonaromatic dicarboxylic acid unit may be derived from one or more of an aliphatic dicarboxylic acid, such as but not limited to malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, and/or suberic acid, one or more of an alicyclic dicarboxylic acid, such as but not limited to 1,3-cyclopentanedicarboxylic acid and/or 1,4-cyclohexanedicarboxylic acid, and the like, and/or combinations thereof.

In exemplary embodiments, the nonaromatic dicarboxylic acid unit may be present in an amount of about 90 mol % or less, for example, about 80 mol % or less, as another example about 70 mol % or less, and as another example about 60 mol % or less, based on 100 mol % of the overall dicarboxylic acid unit.

In exemplary embodiments, the dicarboxylic acid unit may include the nonaromatic dicarboxylic acid unit in an amount of 0 (the nonaromatic dicarboxylic acid unit is not present), about 0 (the nonaromatic dicarboxylic acid unit is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %, based on the total mol % (100 mol %) of the dicarboxylic acid unit. Further, according to some embodiments, the nonaromatic dicarboxylic acid unit may be present in an amount of from about any of the foregoing amounts to about any other of the foregoing amounts.

In exemplary embodiments, the diamine unit may be derived from one or more aliphatic and/or alicyclic diamines. Examples of the aliphatic and/or alicyclic diamines may include without limitation tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane; 2-methyloctamethylenediamine, trimethylhexamethylenediamine, 1,8-diaminooctane, 1,9-diaminononane, 1,10-diaminodecane, 1,12-diaminododecane, and the like, and/or combinations thereof.

In exemplary embodiments, the aromatic polyamide resin may include, for example, polyamide (PA) 6T, polyamide 6T/66, polyamide 6T/DT, polyamide 6T/6I, polyamide 6I, polyamide 9T, polyamide 10T, and/or combinations thereof.

In exemplary embodiments, the aromatic polyamide resin may have a glass transition temperature (Tg) of about 80° C. to about 150° C., for example about 85° C. to about 120° C., for example, 85° C., 90° C., 100° C., 105° C., 110° C., 115° C., or 120° C. Within this range, the aromatic polyamide resin can realize high heat resistance.

In exemplary embodiments, the aromatic polyamide resin may have any molecular weight without limitation and may have an intrinsic viscosity (IV) of about 0.75 dL/g or more, for example, about 0.75 dL/g to about 1.15 dL/g, for example, 0.75 dL/g, 0.8 dL/g, 0.85 dL/g, 0.9 dL/g, 0.95 dL/g, 1 dL/g, 1.05 dL/g, 1.1 dL/g, or 1.15 dL/g, as measured in a sulfuric acid solution at 25° C. using an Ubbelohde viscometer.

In exemplary embodiments, the polyamide resin composition may include the aromatic polyamide resin in an amount of about 30 wt % to about 50 wt %, for example about 30 wt % to about 45 wt %, based on the total weight (100 wt %) of the polyamide resin composition. In some embodiments, the polyamide resin composition may include the aromatic polyamide resin in an amount of about 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %, based on the total weight (100 wt %) of the polyamide resin composition. Further, according to some embodiments, the aromatic polyamide resin may be present in an amount of from about any of the foregoing amounts to about any other of the foregoing amounts. Within this range, the polyamide resin composition can have good properties in terms of heat resistance, impact resistance, plating adhesion, and the like.

(B) Aliphatic Polyamide Resin

According to embodiments of the present invention, the (B) aliphatic polyamide resin is a polyamide in which an aromatic ring is not contained in a molecular chain, and may include a $C_{10}$ to $C_{20}$ aliphatic group.

In exemplary embodiments, the aliphatic polyamide resin may be a homopolymer, copolymer, ter- and/or higher-polymer formed of an aminocarboxylic acid, a lactam and/or a diamine, and a dicarboxylic acid, and the term "copolymer" as used herein refers to polyamide having two or more amide and/or diamide molecular repeat units.

In exemplary embodiments, the aminocarboxylic acid may be a $C_6$ to $C_{12}$ aminocarboxylic acid and may include, for example, one or more of 6-aminocaproic acid, 7-aminoheptanoic acid, 9-aminononanoic acid, 10-aminodecanoic acid, 11-aminoundecanoic acid, 12-aminododecanoic acid, and the like, and/or combinations thereof.

In exemplary embodiments, the lactam may be a $C_4$ to $C_{12}$ lactam and may include, for example, one or more of α-pyrrolidone, ε-caprolactam, ω-laurolactam, ε-enantholactam, and the like, and/or combinations thereof.

In one embodiment, the diamine may be an aliphatic and/or alicyclic diamine and may include, for example, one or more of tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis (aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane; 2-methyloctamethylenediamine, trimethylhexamethylenediamine, 1,8-diaminooctane, 1,9-diaminononane, 1,10-diaminodecane, 1,12-diaminododecane, and the like, and/or combinations thereof.

In exemplary embodiments, the dicarboxylic acid may be an aliphatic and/or alicyclic dicarboxylic acid and may include, for example, one or more of adipic acid, 2-methyladipic acid, trimethyladipic acid, glutaric acid, 2,2-dimethylglutaric acid, pimelic acid, suberic acid, azelaic acid, sebacic acid, dodecanedioic acid, 1,4-cyclohexanedicarboxylic acid, malonic acid, dimethylmalonic acid, succinic acid, 2,2-diethylsuccinic acid, and the like, and/or combinations thereof.

In exemplary embodiments, the aliphatic polyamide resin may include one or more of polyamide 6, polyamide 66, polyamide 46, polyamide 610, polyamide 611, polyamide 612, polyamide 11, polyamide 12, polyamide 910, polyamide 912, polyamide 913, polyamide 914, polyamide 915, polyamide 616, polyamide 936, polyamide 1010, polyamide 1011, polyamide 1012, polyamide 1013, polyamide 1014, polyamide 1111, polyamide 1210, polyamide 1212, polyamide 1213, polyamide 1214, polyamide 614, polyamide 613, polyamide 615, polyamide 616, polyamide 613, and the like. These aliphatic polyamide resins may be used alone or as a mixture thereof.

For example, the aliphatic polyamide resin may include at least one of polyamide (PA) 6, polyamide 66, polyamide 46, polyamide 610, polyamide 611, polyamide 612, polyamide 1010, polyamide 1011, polyamide 1111, polyamide 1212, and/or a combination thereof.

In exemplary embodiments, the aliphatic polyamide resin may have a glass transition temperature (Tg) of about 30° C. to about 80° C., for example about 35° C. to about 50° C., for example, 35° C., 36° C., 37° C., 38° C., 39° C., 40° C., 41° C., 42° C., 43° C., 44° C., 45° C., 46° C., 47° C., 48° C., 49° C., or 50° C., and a melting point of about 160° C. to about 210° C., for example, 160° C., 165° C., 170° C., 175° C., 180° C., 185° C., 190° C., 195° C., 200° C., 205° C., or 210° C. Within this range, the polyamide resin composition can have good properties in terms of impact strength, processability, and the like.

In exemplary embodiments, the aliphatic polyamide resin may have a number average molecular weight (Mn) of about 10,000 g/mol to about 200,000 g/mol, for example, about 20,000 g/mol to about 150,000 g/mol, for example, 20,000 g/mol, 30,000 g/mol, 40,000 g/mol, 50,000 g/mol, 60,000 g/mol, 70,000 g/mol, 80,000 g/mol, 90,000 g/mol, 100,000 g/mol, 110,000 g/mol, 120,000 g/mol, 130,000 g/mol, 140,000 g/mol, or 150,000 g/mol, without being limited thereto.

In exemplary embodiments, the polyamide resin composition may include the aliphatic polyamide resin in an amount of about 10 wt % to about 30 wt %, for example about 10 wt % to about 25 wt %, based on the total weight (100 wt %) of the polyamide resin composition, In some embodiments, the polyamide resin composition may include the aliphatic polyamide resin in an amount of about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, based on the total weight (100 wt %) of the polyamide resin composition. Further, according to some embodiments, the aliphatic polyamide resin may be present in an amount of from about any of the foregoing amounts to about any other of the foregoing amounts. Within this range, the polyamide resin composition can have good properties in terms of heat resistance, impact resistance, plating adhesion, and the like.

According to embodiments of the present invention, the polyamide resin composition may include the aromatic polyamide resin and the aliphatic polyamide resin in a weight ratio (aromatic polyamide resin:aliphatic polyamide resin) of about 1:0.2 to about 1:1, for example about 1:0.2 to about 1:0.8. In exemplary embodiments, the polyamide resin composition may include the aromatic polyamide resin and the aliphatic polyamide resin in a weight ratio (aromatic polyamide resin:aliphatic polyamide resin) of, for example, 1:0.2, 1:0.3, 1:0.4, 1:0.5, 1:0.6, 1:0.7, 1:0.8, 1:0.9, or 1:1. Within this range, the polyamide resin composition can have better long-term heat resistant stability and allows easy extrusion and the like.

(C) Modified Polyolefin Resin

The modified polyolefin resin serves to further improve impact resistance and heat resistance of the polyamide resin composition.

In exemplary embodiments, the modified polyolefin resin may include at least one or more of high density polyethylene, low density polyethylene, linear low density polyethylene, ethylene-α-olefin copolymers, and/or combinations thereof. In addition, the modified polyolefin resin may include at least one or more of modified high density polyethylene, modified low density polyethylene, modified linear low density polyethylene, and/or a modified ethylene-α-olefin copolymer, which is obtained by modifying each of the materials set forth above with at least one compound of α,β-unsaturated dicarboxylic acids and/or α,β-unsaturated dicarboxylic acid derivatives. These modified polyolefin resins may be used singly or as a mixture thereof.

In exemplary embodiments, the modified polyolefin resin may be a modified ethylene-α-olefin copolymer.

An olefin monomer for preparing the ethylene-α-olefin copolymer may be a $C_1$ to $C_{19}$ alkylene and may include, for example, one or more of ethylene, propylene, isopropylene, butylene, isobutylene, and/or octene. These olefin monomers may be used alone or as a mixture thereof.

The modified polyolefin resin may include a reactive group capable of reacting with a polyamide. In this case, the modified polyolefin resin may have a structure in which the reactive group is grafted to a main chain formed of a polyolefin copolymer.

The reactive group may be, for example, a maleic anhydride group and/or an epoxy group.

In exemplary embodiments, the modified polyolefin resin including the reactive group may be a modified ethylene-α-olefin copolymer and/or modified low density polyethylene, which is grafted with a maleic anhydride group.

In exemplary one embodiments, the reactive group may be present in an amount of about 0.05% to about 0.1%, for example, about 0.05%, 0.06%, 0.07%, 0.08%, 0.09%, or 0.1% in the modified polyolefin resin.

In the polyamide resin composition according to the present invention, the modified polyolefin resin serves to improve the degree of dispersion of calcium carbonate and compatibility with the aliphatic polyamide resin and the aromatic polyamide resin, which are set forth above. Thus, the polyamide resin composition can have reduced deterioration in properties due to calcium carbonate and can exhibit improved plating adhesion while maintaining heat resistance and impact resistance within an excellent range.

In exemplary embodiments, the polyamide resin composition may include the modified polyolefin resin in an amount of about 5 wt % to about 15 wt %, based on the total weight (100 wt %) of the polyamide resin composition, In some embodiments, the polyamide resin composition may include the modified polyolefin resin in an amount of about 5 wt %, 6 wt %, 7 wt %, 8 wt %, 9 wt %, 10 wt %, 11 wt %, 12 wt %, 13 wt %, 14 wt %, or 15 wt %, based on the total weight (100 wt %) of the polyamide resin composition. Further, according to some embodiments, the modified polyolefin resin may be present in an amount of from about any of the foregoing amounts to about any other of the foregoing amounts. Within this range, the polyamide resin composition can have better plating adhesion through improvement in plateability.

(D) Calcium Carbonate

The calcium carbonate can improve plating adhesion of the polyamide resin composition and may include any calcium carbonate used for general thermoplastic resin compositions without limitation. The calcium carbonate included in the polyamide resin composition has good effects of forming anchors on a surface of a molded article formed of the polyamide resin composition during etching by an acid component in a plating process while improving surface roughness of the molded article. As a result, the molded article can improve penetrability of a plating solution into the surface of the molded article and thus exhibit improved plating adhesion while maintaining impact resistance within an appropriate range.

In exemplary embodiments, the calcium carbonate may have various particle shapes, such as plate shapes, spherical shapes, and the like. In addition, the calcium carbonate may have an average particle diameter (D50) of about 10 μm to about 200 μm, for example about 50 μm to about 100 μm, for example, 50 μm, 55 μm, 60 μm, 65 μm, 70 μm, 75 μm, 80 μm, 85 μm, 90 μm, 95 μm, or 100 μm. The average particle diameter (D50) is measured by particle size analyzer that utilizes laser diffraction analysis. The average particle diameter (D50) calculated based on sieve analysis results, creating an S-curve of cumulative mass retained against sieve mesh size, and calculating the intercepts for 50% mass. Within this range of average particle diameter, the molded article produced from the polyamide resin composition can have better stiffness, impact resistance, appearance, and the like.

In exemplary embodiments, the polyamide resin composition may include the calcium carbonate in an amount of about 5 wt % to about 50 wt %, for example about 15 wt % to 45 wt %, based on the total weight (100 wt %) of the polyamide resin composition. In some embodiments, the polyamide resin composition may include the calcium carbonate in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %, based on the total weight (100 wt %) of the polyamide resin composition. Further, according to some embodiments, the calcium carbonate may be present in an amount of from about any of the foregoing amounts to about any other of the foregoing amounts. Within this range, the polyamide resin composition can have good properties in terms of heat resistance, impact resistance, plating adhesion, and the like.

According to embodiments of the present invention, in addition to the components set forth above, the polyamide resin composition may further include one or more of a thermoplastic resin, for example, a thermoplastic resin including a polycarbonate resin, a polyester resin, an aromatic vinyl resin and blends thereof, and one or more additives, within the range not inhibiting the effects of the present invention. Examples of the additives include flame retardants, antioxidants, lubricants, release agents, nucleating agents, antistatic agents, stabilizer, colorants, and the like, and mixtures thereof, without being limited thereto. The additives may be present in an amount of about 10 parts by weight or less, for example, about 1 part by weight, 2 parts by weight, 3 parts by weight, 4 parts by weight, 5 parts by weight, 6 parts by weight, 7 parts by weight, 8 parts by weight, 9 parts by weight, or 10 parts by weight, relative to about 100 parts by weight of the polyamide resin composition.

In exemplary embodiments, the polyamide resin composition may have a notched Izod impact strength of about 6 kgf·cm/cm to about 20 kgf·cm/cm, for example about 6 kgf·cm/cm to about 10 kgf·cm/cm, for example, 6 kgf·cm/cm, 7 kgf·cm/cm, 8 kgf·cm/cm, 9 kgf·cm/cm, 10 kgf·cm/cm, 11 kgf·cm/cm, 12 kgf·cm/cm, 13 kgf·cm/cm, 14 kgf·cm/cm, 15 kgf·cm/cm, 16 kgf·cm/cm, 17 kgf·cm/cm, 18 kgf·cm/cm, 19 kgf·cm/cm, or 20 kgf·cm/cm, as measured on a ⅛" thick specimen in accordance with ASTM D256. Within this range, the polyamide resin composition can have excellent impact resistance.

The polyamide resin composition may have a copper layer peel strength of about 10 N/cm to about 25 N/cm, for example about 10 N/cm to about 20 N/cm, for example, about 10 N/cm, 11 N/cm, 12 N/cm, 13 N/cm, 14 N/cm, 15 N/cm, 16 N/cm, 17 N/cm, 18 N/cm, 19 N/cm, 20 N/cm, 21 N/cm, 22 N/cm, 23 N/cm, 24 N/cm, or 25 N/cm, as measured on an injection-molded specimen plated with a 35 μm thick stripe-shaped copper layer and having a size of 100 mm×100 mm×3.2 mm at a peeling rate of 50 mm/min using a tensile tester in accordance with JIS C6481. Within this range, the polyamide resin composition can have excellent plating adhesion.

The polyamide resin composition may have a heat deflection temperature (HDT) of about 100° C. to about 200° C., for example about 100° C. to about 140° C., for example, about 100° C., 101° C., 102° C., 103° C., 104° C., 105° C., 106° C., 107° C., 108° C., 109° C., 110° C., 111° C., 112°

C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., or 140° C., as measured on a ¼" thick specimen under a load of 1.82 MPa in accordance with ASTM D648. Within this range, the polyamide resin composition can have excellent heat resistance.

The polyamide resin composition according to the present invention may be prepared by a method of preparing a thermoplastic resin composition known in the art. For example, the polyamide resin composition may be prepared in the form of pellets by mixing the components set forth above and other additives, as needed, followed by performing melt extrusion in an extruder.

Other embodiments relate to a molded article formed of the polyamide resin composition as set forth above. Various molded articles (products) may be manufactured by various molding methods, such as injection molding, extrusion, vacuum molding, casting, and the like, on pellets produced from the polyamide resin composition. These molding methods are well-known to those skilled in the art.

The molded article may be used for various applications, such as electric/electronic products, automotive interior/exterior materials, and the like. In particular, the molded article is useful for automotive interior/exterior materials requiring high stiffness, good plating appearance, and the like.

Other embodiments relate to a composite including: a resin layer formed of the polyamide resin composition as set forth above; and a plating layer formed on at least one surface of the resin layer.

EXAMPLES

Next, the present invention will be described in more detail with reference to the following examples. However, it should be understood that these examples are provided for illustration only and are not to be construed in any way as limiting the present invention.

Details of components used in Examples and Comparative Examples are as follows.

(A) Aromatic Polyamide Resin
Polyamide PA6T/6I (model: A1007, Solvay Co., Ltd.) is used.
(B) Aliphatic Polyamide Resin
(b1) Polyamide 66 (PA66, model: 23AE1K, Rhodia Korea Co., Ltd.) is used.
(b2) Polyamide 6 (PA6, model: EN300, KP Chemtech Co., Ltd.) is used.
(C) Modified Polyolefin Resin
A maleic anhydride graft-modified ethylene-octene copolymer (model: N493D, DuPont Co., Ltd.) is used.
(D) Calcium Carbonate
Calcium carbonate (Dongwha Materials Co., Ltd.) having an average particle diameter (D50) of 80 μm is used.
(E) Kaolin
Kaolin (Australian China Clays Co., Ltd.) is used.

Examples 1 to 3 and Comparative Examples 1 to 5

The components set forth above are mixed in amounts as listed in Tables 1 and 2, followed by introducing the mixture into a twin-screw extruder having L/D=36 and a diameter of 45 mm. Then, the mixture is melted and extruded at a barrel temperature of 280° C. at a screw rotation speed of 200 rpm and at a discharge rate of 80 kg/hr, thereby preparing pellets. The prepared pellets were dried at 100° C. for 4 hours or more, followed by injection molding at a molding temperature of 300° C. at a mold temperature of 80° C. in an injection molding machine, thereby preparing a specimen. The prepared specimen is evaluated as to the following properties. Results are shown in Tables 3 and 4.

TABLE 1

| (wt %) | Example 1 | Example 2 | Example 3 |
|---|---|---|---|
| (A) | 40 | 40 | 30 |
| (B) (b1) | — | 10 | 20 |
| (B) (b2) | 10 | — | — |
| (C) | 10 | 10 | 10 |
| (D) | 40 | 40 | 40 |
| (E) | — | — | — |

TABLE 2

| (wt %) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| (A) | 50 | 40 | 30 | 20 | 40 | 50 | 45 |
| (B) (b1) | — | 10 | 20 | 30 | — | — | — |
| (B) (b2) | — | — | — | — | 10 | — | — |
| (C) | 10 | 10 | 10 | 10 | 10 | 5 | 5 |
| (D) | — | — | — | — | — | 45 | 50 |
| (E) | 40 | 40 | 40 | 40 | 40 | — | — |

Evaluation of Properties (1) Notched Izod impact strength (unit: kgf·cm/cm): Notched Izod impact strength is measured on a ⅛" thick notched specimen in accordance with ASTM D256.

(2) Heat deflection temperature (° C.): Heat deflection temperature (HDT) is measured on a ¼" thick specimen under a load of 1.82 MPa in accordance with ASTM D648.

(3) Plating adhesion (N/cm): Copper layer peel strength is measured on an injection-molded specimen plated with a 35 μm thick stripe-shaped copper layer and having a size of 100 mm×100 mm×3.2 mm at a peeling rate of 50 mm/min using a tensile tester in accordance with JIS C6481.

TABLE 3

|  | Example 1 | Example 2 | Example 3 |
|---|---|---|---|
| Impact strength (kgf · cm/cm) | 6.4 | 6.0 | 6.2 |
| Heat deflection temperature (° C.) | 101.4 | 110.7 | 106.3 |
| Plating adhesion (N/cm) | 15.0 | 15.8 | 14.5 |

TABLE 4

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Impact strength (kgf·cm/cm) | 7.4 | 6.5 | 6.7 | 6.6 | 7.3 | 5.5 | 5.2 |
| Heat deflection temperature (° C.) | 133.8 | 112.0 | 96.3 | 92.7 | 98.8 | 130.1 | 121.3 |
| Plating adhesion (N/cm) | 8.6 | 8.2 | 3.0 | 1.9 | 4.5 | 13.0 | 13.6 |

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A polyamide resin composition consisting essentially of:
   (A) about 30 wt % to about 45 wt % of an aromatic polyamide resin;
   (B) about 10 wt % to about 25 wt % of an aliphatic polyamide resin;
   (C) about 5 wt % to about 15 wt % of a modified polyolefin resin; and
   (D) about 15 wt % to about 40 wt % of calcium carbonate having an average particle diameter (D50) of 60 μm to about 100 μm,
   wherein a weight ratio of the aromatic polyamide resin to the aliphatic polyamide resin ranges from about 1:0.2 to about 1:0.8, and
   wherein the polyamide resin composition has a notched Izod impact strength of about 6 kgf·cm/cm to about 20 kgf·cm/cm, as measured on a ⅛" thick specimen in accordance with ASTM D256; a copper layer peel strength of 10 N/cm to about 25 N/cm, as measured on an injection-molded specimen plated with a 35 μm thick stripe-shaped copper layer and having a size of 100 mm×100 mm×3.2 mm at a peeling rate of 50 mm/min using a tensile tester; and a heat deflection temperature (HDT) of 100° C. to about 200° C., as measured on a ¼" thick specimen under a load of 1.82 MPa in accordance with ASTM D648, wherein the modified polyolefin resin comprises a polyolefin resin grafted with at least one epoxy group,
   wherein the aliphatic polyamide is made from diamine units where the diamine units consist of tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl) cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, 1,12-diaminododecane, or combinations of these diamines.

2. The polyamide resin composition according to claim 1, wherein the aromatic polyamide resin comprises polyamide (PA) 6T, polyamide 6T/66, polyamide 6T/DT, polyamide 6T/6I, polyamide 6I, polyamide 9T, polyamide 10T, or a combination thereof.

3. The polyamide resin composition according to claim 1, wherein the aliphatic polyamide resin comprises polyamide (PA) 6, polyamide 66, polyamide 46, polyamide 610, polyamide 611, polyamide 612, polyamide 1010, polyamide 1011, polyamide 1111, polyamide 1212, or a combination thereof.

4. A molded article formed of the polyamide resin composition according to claim 1.

5. A composite comprising: a resin layer formed of the polyamide resin composition according to claim 1; and a plating layer formed on at least one surface of the resin layer.

6. The polyamide resin composition according to claim 1, wherein the calcium carbonate has an average particle diameter (D50) of about 70 μm to about 100 μm.

7. The polyamide resin composition according to claim 1, wherein the polyamide resin composition has a copper layer peel strength of about 12 N/cm to about 25 N/cm, as measured on an injection-molded specimen plated with a 35 μm thick stripe-shaped copper layer and having a size of 100 mm×100 mm×3.2 mm at a peeling rate of 50 mm/min using a tensile tester.

8. A polyamide resin composition consisting essentially of:
   (A) about 30 wt % to about 50 wt % of an aromatic polyamide resin;
   (B) about 10 wt % to about 30 wt % of an aliphatic polyamide resin;
   (C) about 5 wt % to about 15 wt % of a modified polyolefin resin; and
   (D) about 5 wt % to about 50 wt % of calcium carbonate having an average particle diameter (D50) of 60 μm to about 100 μm,
   wherein the polyamide resin composition has a notched Izod impact strength of about 6 kgf·cm/cm to about 20 kgf·cm/cm, as measured on a ⅛" thick specimen in accordance with ASTM D256; a copper layer peel strength of 10 N/cm to about 25 N/cm, as measured on an injection-molded specimen plated with a 35 μm thick stripe-shaped copper layer and having a size of 100 mm×100 mm×3.2 mm at a peeling rate of 50 mm/min using a tensile tester; and a heat deflection temperature (HDT) of 100° C. to about 200° C., as measured on a ¼" thick specimen under a load of 1.82 MPa in accordance with ASTM D648, wherein the modified polyolefin resin comprises a polyolefin resin grafted with at least one epoxy group, wherein the aliphatic polyamide is made from diamine units where the diamine units consist of tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl) cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl) piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, 1,12-diaminododecane, or combinations of these diamines.

9. The polyamide resin composition according to claim 8, wherein the calcium carbonate has an average particle diameter (D50) of about 70 μm to about 100 μm.

10. The polyamide resin composition according to claim 8, wherein the polyamide resin composition has a copper layer peel strength of about 12 N/cm to about 25 N/cm, as measured on an injection-molded specimen plated with a 35 μm thick stripe-shaped copper layer and having a size of 100 mm×100 mm×3.2 mm at a peeling rate of 50 mm/min using a tensile tester.

* * * * *